June 15, 1926. 1,588,666
P. S. DONCHIAN
CAMERA
Filed June 8, 1923 2 Sheets-Sheet 1
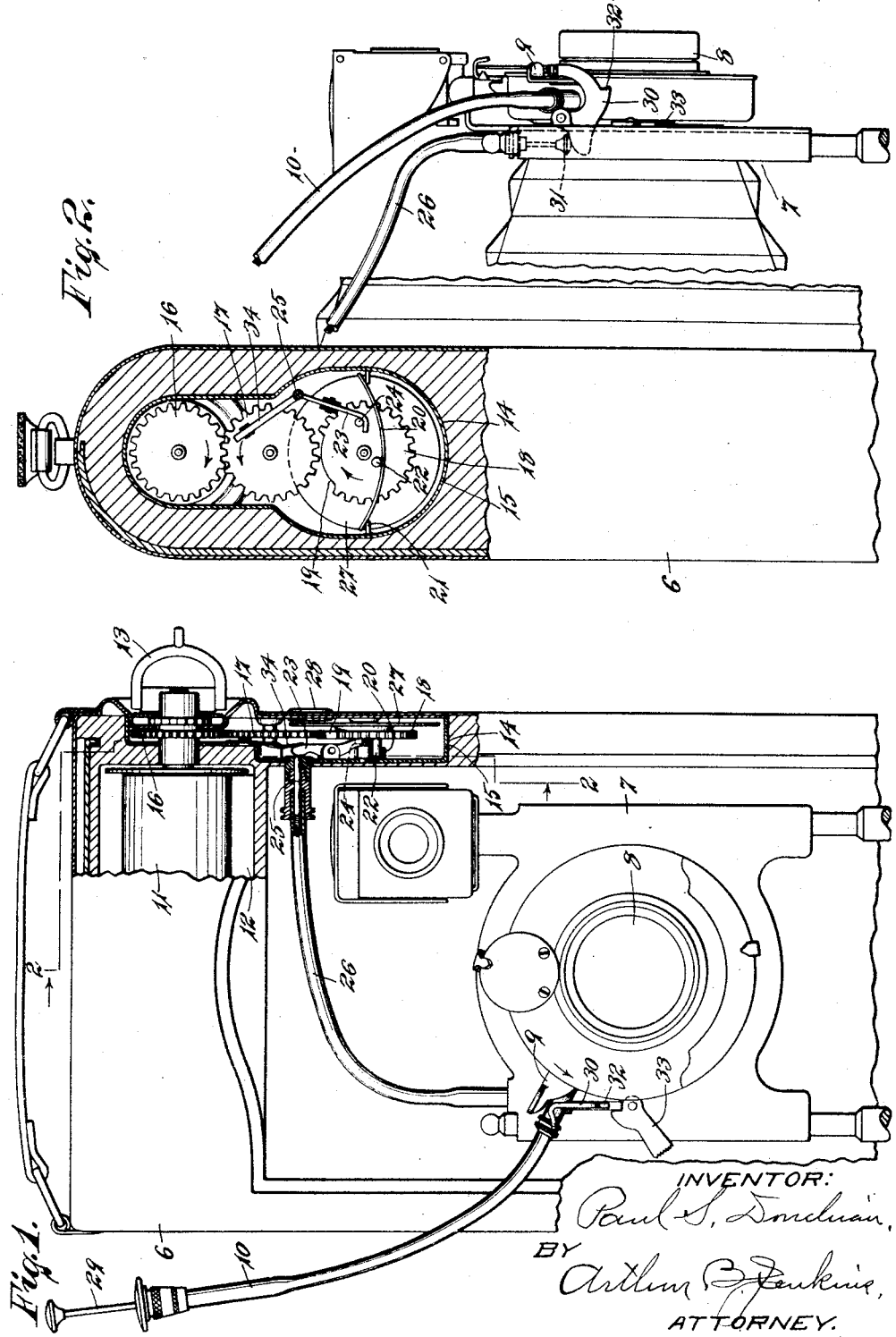

June 15, 1926.

P. S. DONCHIAN

CAMERA

Filed June 8, 1923

INVENTOR:
Paul S. Donchian,
BY
Arthur B. Jenkins.
ATTORNEY.

Patented June 15, 1926.

1,588,666

UNITED STATES PATENT OFFICE.

PAUL S. DONCHIAN, OF HARTFORD, CONNECTICUT.

CAMERA.

Application filed June 8, 1923. Serial No. 644,156.

My invention relates to the class of devices above named, and more especially to that class of cameras in which unexposed portions of a film are successively exposed to the action of the lens, and an object of my invention, among others, is the provision of means whereby the position of the exposed or unexposed portion of the film with respect to the lens may be certainly determined; and a further object of the invention is to provide means whereby such mechanism may be readily attached to cameras without material change of the other mechanism therein.

Forms of structures illustrating the adaptation of my invention, and in the construction and use of which the objects herein set out, as well as others, may be attained, are illustrated in the accompanying drawings, in which—

Figure 1 is a view in front elevation of a portion of a camera equipped with my improved device, and with parts broken away to show construction.

Figure 2 is a view in section on a plane denoted by the dotted line 2—2 of Figure 1.

Figure 5:
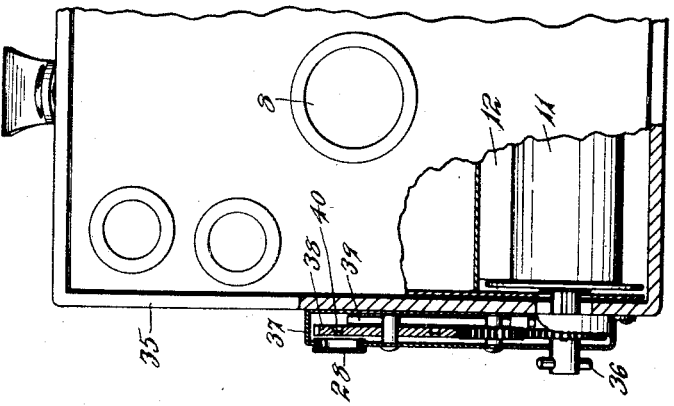
Figure 5 is an end view of the device shown in Figure 4 with parts broken away to show construction.

In the use of cameras of the types herein illustrated and described it is essential that the position of the exposed and unexposed portions of the film with respect to the lens may be certainly determined at any time, this especially to avoid unintentional double exposure of portions of the film, and also to insure exposure of each successive section of the entire film, and to effect this result it is desirable that the mechanism of cameras now in common use shall not be changed to any substantial extent either in construction or in manner of operation. I have, therefore, provided means for effecting my purpose by simply adding my improved device to the mechanism of such cameras and without change in the regular equipment thereof, such mechanism being shown in the accompanying drawings wherein the numeral 6 indicates the case of a camera of an ordinary and well known make, such camera, briefly speaking, comprising the usual extensible portion 7 mounting a lens 8 and having a shutter actuating lever 9 operatively connected with a flexible shutter actuator 10 in a manner well known. A film roll 11 is mounted in the upper part of the case to receive a film 12 that extends to another roll, not shown, upon which the film is wound in the lower part of the case, in a manner that will be readily understood, the roll 11 having the usual finger piece 13 by means of which it is rotated to pass the film from one roll to the other. All of the parts thus far described are of old and well known construction and further and detailed description is, therefore, omitted herein.

In affixing my improved device to a camera provided with the mechanism hereinabove described, I construct a recess 14 in the end wall of the case 6 and place a gear case 15 in said recess to receive a train of gears comprising a film roll gear 16 secured to the roll 11 and meshing with an intermediate gear 17 that is operatively connected with a controller for controlling the operation of the parts, in the mechanism shown herein this controller being in the form of a controller gear 18, all of said gears being rotatably mounted in the gear case 15. This controller gear has teeth removed from a section thereof forming a toothless segment 19 thereon. This gear is provided with means for positioning it to mesh with the gear 17, such mechanism, in the structure herein shown, comprising a positioning spring 20 seated at its opposite ends on rests 21, this spring being interposed intermediate its ends in the path of movement of a positioning stud 22 projecting from the side of the gear 18, and as shown in Figure 2 of the drawings. The purpose of this construction is to cause the spring to be placed under tension as the gear, in its rotation, carries the stud against said spring, the latter maintaining this tension until the stud passes the "dead center" when the spring imparts to the gear a lost motion of a certain degree and sufficient to bring the teeth thereon into position to be engaged by the teeth of the gear 17 when the latter is rotated.

A controller retaining lever 23 is pivotally mounted on a wall of the recess 14 or of the case 15, the end of the lever being adapted to engage a retaining pin 24 projecting from the side of the controller gear 18, and thus retain said controller gear against rotation until released. The end of said lever opposite the pin 24 is located in the path of movement of an actuating plunger 25 constituting the end of a flexible gear releasing actuator 26 operating by endwise movement under force in a manner similar to the actuator 10. The force for effecting this endwise movement of the actuator 26 is obtained by means of a controller actuating lever 30 pivotally mounted on the extensible portion 7 of the camera with one end in the path of movement of the shutter actuating lever 9 and the other end located to engage a button 31 comprising the terminal at the end opposite the thumb button on the extensible member 29 of the shutter actuator 10, said button 31 thereby constituting the operating means for the actuator 26, and as shown in Figure 2 of the drawings. The lever 30 is provided with a locking shoulder 32 for engagement by a locking latch 33 (see Figures 2 and 1) whereby the lever 30 may be held in a position out of the path of movement of the shutter operating lever 9 for a purpose to be hereinafter described.

Figure 3:
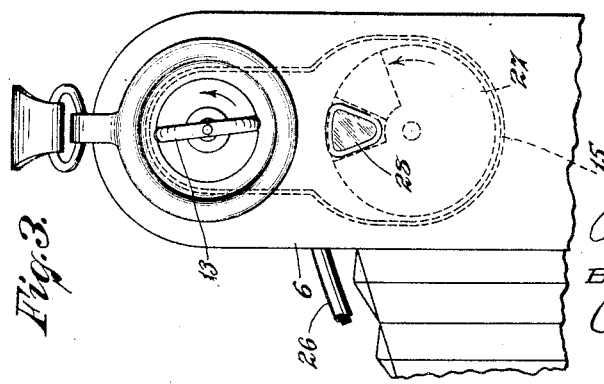
Figure 3 is an end view of a portion of my improved camera.

An indicator is operatively arranged with respect to the train of gears above described to denote whether or not the film has been moved after an exposure thereof, in the arrangement herein shown this indicator comprising an indicating disc 27 secured to rotate with the controller 18. This disc is provided with colored portions adapted to show through a window 28 formed in the cover for the recess 14 and in the end wall of the case 6, as shown in Figures 1 and 3 of the drawings. One of these colored portions of the disc may be red and the other green.

In the operation of the device thus far described, let it be supposed that the mechanism is in readiness for an exposure of the film for the purpose of taking a picture, the parts being in the positions illustrated in the drawings and the green colored portion of the disc 27 showing through the window 28, thus denoting that everything is in readiness for taking a picture. Pressure upon the thumb button 29 of the shutter actuator 10 will cause the shutter actuating lever 9 to be operated in the usual manner to actuate the shutters to expose a film. As the lever 9 moves downwardly from the position shown in Figure 1 it will make contact with the controller actuating lever 30 and swing the latter on its pivot, thereby imparting endwise movement to the gear releasing actuator 26 to operate the retaining lever 23 to release the retaining pin 24. Such release of said pin will permit rotation of the controller 18 under the force of the spring 20 from the position shown in Figure 2 into position for engagement of the teeth of said controller with the teeth of the gear 17, when the latter shall be rotated. This operation of taking a picture has "set" the controller 18, or in other words has effected one partial movement thereof, and has positioned the indicating disc 27 to denote that an exposed part of the film is in position for action of the lens thereon and, therefore, that the shutter should not be operated. This may be denoted by the red portion of the indicator showing through the window 28.

The other partial movement of the controller and of the indicating disc and the operation of the entire indicating mechanism will now take place when the finger piece 13 is operated to roll the film on to the receiving roll and to place an unexposed portion of the film in position for action thereon of the lens. As said finger piece is turned the gears 16 and 17 will be rotated and the teeth of the gears 17 and 18 aided by a slight tension on the spring 20, if desired, will be caused to mesh and thereby the controller or gear 18 will be turned into the position shown in Figure 2 with the teeth of the gears 17 and 18 unmeshed, and the spring 20 under tension to force the retaining pin 24 against the retaining lever 23 to be held thereby, it being understood that said lever was returned to its normal position by operation of a retaining lever spring 34 acting against said lever as shown in Figure 2 of the drawings. This operation just described will rotate the disc 27 to place the green colored portion of the indicator in view through the window 28, and the camera is now ready for a repetition of the operation just described.

When it may be desired to take a picture by operating the shutter through the medium of a cord attached to the shutter operating lever 9, the controller actuating lever 30 will be manually swung into position for engagement by the latch 33 by which said lever will be held out of reach of the shutter operating lever 9, and undue resistance to operation of the lever 9 will therefore be eliminated, and liability of movement of a tripod upon which the camera may be supported, and by reason of the pull upon said cord, will be avoided.

In thus moving the lever 30 for engagement with the latch, as above described, the actuator 26 and lever 23 will be operated to release the controller 18 and effect the "setting" of the latter, as hereinbefore described.

Figure 4:
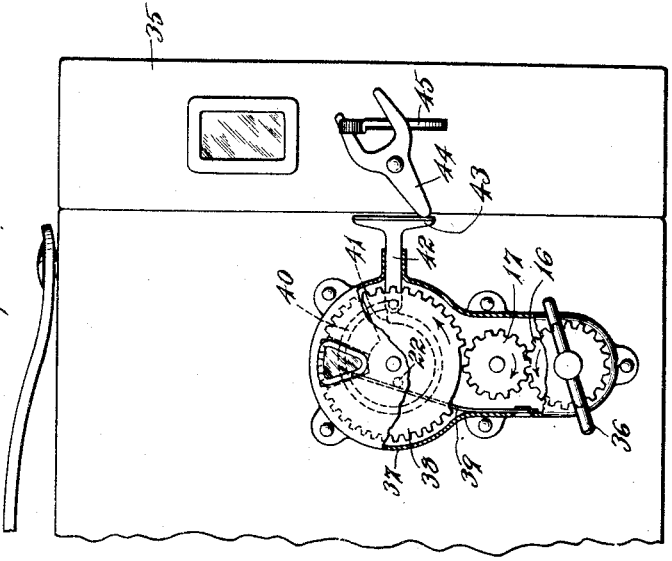
Figure 4 is a view showing the application of my invention to a camera of a slightly different construction from that illustrated in the preceding views, and with parts broken away to show construction.

That form of my improved device illustrated in Figures 4 and 5 comprises a case 35 having the film roll 11, film 12 and a finger piece 36. A case 37 is attached to the outer surface of the camera case 35 and contains the gears 16, 17 and 38, all connected and operating as hereinbefore described with respect to the gears in the other form of the device. The positioning spring 39 is attached at one end to the inner wall of the case 37 but it operates against the positioning stud 22, as hereinbefore described. In this form of the device the controller gear 38 has a controller groove 40 spirally formed and including a releasing groove 41. The controller retaining member is in the form of a sliding detent 42 having a stud projecting into the groove 40. This detent extends from within the case to a point outside of the case where it is provided with a push-piece 43 to receive the thrust of a gear releasing actuator 44 in the form of a forked lever pivotally mounted on the case 35 and adapted to press with one end against the pushpiece 43 and having its other forked end engaged by a lever 45 common to cameras of this type and the operation of which, therefore, will be readily understood without further explanation.

In the operation of this form of the device, when the lever 45 is moved to operate the shutter for taking a picture, said lever pushes the detent 42 inward so that the stud thereon is moved from engagement with the shoulder formed by the groove 41 and the gear 38 is thereby released. The force of the spring 39 being exerted to cause rotation of said gear 38, as soon as the stud is disengaged from said shoulder the gear will be rotated in a direction indicated by the arrow in Figure 4 to bring its teeth into position to mesh with the gear 17 and the indicating devices will be operated, all in the manner as hereinbefore described with respect to the device of Figures 1, 2 and 3, and the operation of the finger piece 36 will complete the operation of the indicating mechanism as hereinbefore described with respect to the other device.

While the indicating medium has been shown herein as comprising contrasting colors displayed upon the disc 27, it is obvious that any other medium, as to color or other indicating means, may be employed without departing from the spirit and intent of the invention.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other then those above set out.

I claim:—

1. A camera including an indicator, a shutter with means for operating it, a film support with means for operating it, intermeshing gears operatively connected with both of said operating means, means for permitting operation of one of said gears independently of another, a retainer to prevent operation of said last mentioned gear, and a connection between one of said operating means and said retainer for operation of the latter.

2. A camera including an indicator, a shutter with means for operating it, a film support with means for operating it, intermeshing gears operatively connected with both of said operating means, means for permitting operation of one of said gears independently of another, a retainer to prevent operation of said last mentioned gear, and a connection between said shutter operating means and said retainer for operating the latter.

3. A camera including an indicator, a film support with means for operating it, a connection between said film support operating means and said indicator including a controller for loosely connecting said indicator and film support operating means, and also for providing a positive connection between said parts, a shutter operating lever, and means connected with said lever to permit operation of said controller independently of said lever.

PAUL S. DONCHIAN.